United States Patent
Yoo et al.

(10) Patent No.: US 12,021,294 B2
(45) Date of Patent: Jun. 25, 2024

(54) CLAMPING DEVICE FOR ANTENNA

(71) Applicant: KMW INC., Hwaseong-si (KR)

(72) Inventors: Chang Woo Yoo, Hwaseong-si (KR); Jin Soo Yeo, Hwaseong-si (KR); In-Ho Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 279 days.

(21) Appl. No.: 17/474,079

(22) Filed: Sep. 14, 2021

(65) Prior Publication Data

US 2021/0408662 A1  Dec. 30, 2021

Related U.S. Application Data

(63) Continuation of application No. PCT/KR2020/003641, filed on Mar. 17, 2020.

(30) Foreign Application Priority Data

Mar. 19, 2019  (KR) .......................... 10-2019-0031264
Oct. 30, 2019  (KR) .......................... 10-2019-0136083

(51) Int. Cl.
    *H01Q 1/12*  (2006.01)
(52) U.S. Cl.
    CPC ........... *H01Q 1/125* (2013.01); *H01Q 1/1228* (2013.01)
(58) Field of Classification Search
    CPC .... H01Q 1/125; H01Q 1/1228; H01Q 1/1264; H01Q 1/246; H01Q 3/08; F16B 2/06
    See application file for complete search history.

(56) References Cited

U.S. PATENT DOCUMENTS 9,976,698 B1 *  5/2018  Davis ................. F16M 11/2064

FOREIGN PATENT DOCUMENTS

| EP | 0685617 A1 | 12/1995 |
| JP | 60-163807 U | 10/1985 |
| JP | 07-307606 A | 11/1995 |
| JP | H07-307606 A | 11/1995 |
| JP | H09116319 A | 5/1997 |

(Continued)

OTHER PUBLICATIONS

International Search Report mailed Jun. 29, 2020 for International Application No. PCT/KR2020/003641 and its English translation.

(Continued)

*Primary Examiner* — Seung H Lee
(74) *Attorney, Agent, or Firm* — Insight Law Group, PLLC; Seung Lee

(57) ABSTRACT

The present invention relates to a clamping device for an antenna and, in particular, to a clamping device for an antenna which include: an arm unit coupled to a support pole and having a rotating shaft groove opening upward in a front end portion; a rotation unit detachably mounted in the rotating shaft hole of the arm unit and coupled to be rotatable at a predetermined angle in the left and right direction around the rotating shaft hole; and a tilting unit coupled to the front end portion of the rotation unit so as to be tiltable in the vertical direction while mediating coupling of an antenna device. Due to this feature, the clamping device for an antenna provides the advantages of eliminating spatial limitations on a plurality of antenna devices for the support pole and improving workability.

20 Claims, 13 Drawing Sheets

(56) References Cited

FOREIGN PATENT DOCUMENTS

| | | |
|---|---|---|
| JP | 2002-009517 A | 1/2002 |
| JP | 2006-211110 A | 8/2006 |
| JP | 2006-270574 A | 10/2006 |
| JP | 3127558 U | 11/2006 |
| KR | 10-2009-0006777 A | 1/2009 |
| KR | 10-2009-0017933 A | 2/2009 |
| KR | 20-2011-0001413 U | 2/2011 |
| KR | 10-1364102 B1 | 2/2014 |
| KR | 10-1455691 B1 | 11/2014 |
| KR | 10-1926109 B1 | 12/2018 |

OTHER PUBLICATIONS

Non-final office action mailed Jun. 28, 2022 for Japanese Application No. 2021-555524.
Non-final office action mailed May 23, 2022 for Indian Application No. 202117046915.
Extended European Search Report mailed Jun. 9, 2023 for European Application No. 20773599.4.

* cited by examiner

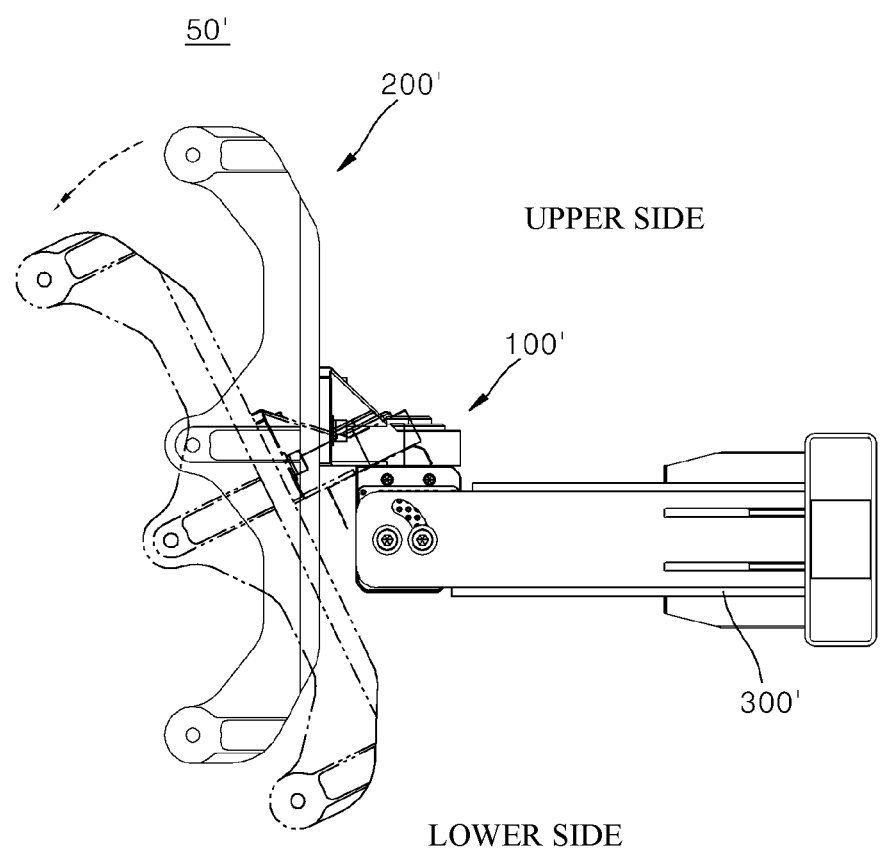

CLAMPING DEVICE FOR ANTENNA

CROSS-REFERENCE TO RELATED APPLICATIONS

This application is a continuation application of International Application No. PCT/KR2020/003641, filed Mar. 17, 2020, which claims the benefit of Korean Patent Application Nos. 10-2019-0031264, filed Mar. 19, 2019, and 10-2019-0136083, filed Oct. 30, 2019, in the Korean Intellectual Property Office, the disclosures of which are incorporated herein in their entirety by reference.

TECHNICAL FIELD

The present disclosure relates to a clamping device for an antenna, and more particularly, to a clamping device for an antenna, in which an antenna device can be efficiently disposed in a compact installation space as well as a direction of the antenna device is easily adjusted.

BACKGROUND ART

Wireless communication technology, for example, multiple-input multiple-output (MIMO) technology is technology that remarkably increases a data transmission capacity using multiple antennas, and is a spatial multiplexing technique for transmitting different data through each transmitting antenna at a transmitter and for sorting the transmitted data through adequate signal processing at a receiver.

Therefore, by simultaneously increasing the number of transmitting antennas and the number of receiving antennas, a channel capacity is increased, and more data can be transmitted. For example, if the number of antennas is increased to ten, a channel capacity of about ten times is secured using the same frequency band compared to a current single antenna system.

In 4G LTE-Advanced, antennas are used up to eight, and products in which 64 or 128 antennas are mounted in a pre-5G step have been developed at present. It is expected that base station equipment having far more antennas will be used in 5G, which is referred to as Massive MIMO technology. A current cell operation is of two dimensions, whereas, if the Massive MIMO technology is introduced, 3D-Beamforming is possible, thus being also referred to as full dimension (FD)-MIMO.

In the Massive MIMO technology, as the number of antennas (ANTS) increases, the number of transmitters and the number of filters are increased together. However, due to lease expenses of an installation space or spatial limitations, RF elements (antenna/filter/power amplifier/transceiver, etc.) are actually made small, light, and inexpensive. Massive MIMO requires a high output for coverage expansion, and power consumption and a heating value caused by the high output act as negative factors in reducing weight and a size.

Especially, when a MIMO antenna, in which modules implemented by RF elements and digital elements are coupled in a layered structure, is installed in a restricted space, the necessity for compact and miniature design of a plurality of layers constituting the MIMO antenna in order to maximize installation easiness or spatial applicability is rising, and the necessity for free direction adjustment of an antenna device installed on one support pole is strongly requested.

DISCLOSURE

Technical Problem

An object of the present disclosure is to provide a clamping device for an antenna which can increase a degree of freedom of installation with respect to a support pole having many spatial limitations and improve workability.

In addition, another object of the present disclosure is to provide a clamping device for an antenna in which an antenna device is easily installed and assembled on a tilting unit.

Technical objects of the present disclosure are not limited to the aforementioned technical object, and other technical objects not described above may be evidently understood by those skilled in the art from the following description.

Technical Solution

An embodiment of a clamping device for an antenna according to the present disclosure includes: an arm unit coupled to a support pole and having a rotating shaft hole that is formed in a front end portion thereof and opens upward; a rotation unit detachably mounted in the rotating shaft hole of the arm unit and coupled to be rotatable about the rotating shaft hole at a predetermined angle in a left-right direction; and a tilting unit coupled to a front end portion of the rotation unit so as to be tiltable in an up-down direction and configured to mediate coupling of an antenna device.

Here, the arm unit may include: an outer mounting block disposed to come into close contact with one side of an outer circumferential surface of the support pole; an inner mounting block disposed to come into close contact with the other side of outer circumferential surface of the support pole and fixed with the outer mounting block by at least one or more fixing bolts; and a clamp arm configured to extend from the inner mounting block at a predetermined length in a direction orthogonal to the support pole and to constitute a front end portion in which the rotating shaft hole is provided.

Moreover, at least one or more reinforcement ribs may be formed at a connecting part between the inner mounting block and the clamp arm of the arm unit.

Moreover, the rotation unit may include: tilting unit installing stages to which the tilting unit is tiltably coupled; a rotating shaft rod that is inserted into and placed in the rotating shaft hole of the arm unit; and a connecting block that interconnects the tilting unit installing stages and the rotating shaft rod.

Moreover, tilting braking washer pads may be interposed between the tilting unit installing stages and the tilting unit.

Moreover, tilting braking washer pad mounting recesses to which the tilting braking washer pads are coupled in a shape-fitted state may be formed in inner lateral surfaces of the tilting unit installing stages.

Moreover, a plurality of braking protrusions may be formed on inner lateral surfaces of the tilting braking washer pads so as to protrude.

Moreover, the tilting unit installing stages may be provided in a pair so as to be spaced apart from each other and to extend from left and right end portions of the connecting block toward the tilting unit, and tilting pins becoming a tilting center of the tilting unit may be provided on outer lateral surfaces of the tilting unit installing stages so as to be connected to the tilting unit.

Moreover, the tilting unit may include: antenna coupling stages that are coupled with the antenna device; and tilting plates that are coupled to come into surface contact with one outer lateral surface or the other outer lateral surface of the rotation unit, and tilting guides may be formed in a slot hole shape and are attached to the tilting plates so as to guide a tilting motion of the tilting unit.

Moreover, the tilting plates may be tilted about tilting pins provided on outer lateral surfaces of the tilting unit installing stages of the rotation unit so as to become the tilting center of the tilting unit, and the tilting guides may include: tilting guide slots that are formed on circumferences having common centers with the tilting pins; and tilting guide bolts that pass through the tilting guide slots from an outside and are fixed to the rotation unit.

Moreover, a tilting angle label, which indicates a position of the tilting guide bolt moving in the tilting guide slot from a reference point at an angle, may be attached to an outer lateral surface of the tilting plate.

Moreover, the tilting unit may further include expansion connectors that are expanded to connect the antenna coupling stages and the tilting plates in a left-right direction.

Moreover, each of the antenna coupling stages may come into surface contact with a plurality of places of any one of a rear surface and a lateral surface of the antenna device, and may be fastened and fixed to fastening holes formed in the plurality of places of any one of the rear surface and the lateral surface of the antenna device via fastening means.

Moreover, the support pole may include: multiple support rods that slantly extend downward from an outer circumferential surface of the support pole and are radially spaced apart from one another at a predetermined angle; and supporting panels that are provided at tips of the multiple support rods and are supported and coupled to a ground or a wall.

Another embodiment of a clamping device for an antenna according to the present disclosure includes: an arm unit which is coupled to a support pole and in a front end portion of which a tilting mounting space that opens front and rear and up and down except left and right sides is formed; a tilting unit that is coupled to the tilting mounting space of the arm unit so as to be tiltable in an up-down direction and has a rotating shaft hole that opens upward; and a rotation unit that is detachably mounted in the rotating shaft hole of the tilting unit, is coupled to be rotatable about the rotating shaft hole at a predetermined angle in a left-right direction, and mediates coupling of an antenna device.

Here, the tilting unit may be mounted in the tilting mounting space, and be provided in a shape in which only an upper end portion thereof to which the rotation unit is coupled and a lower end portion thereof opposite to the upper end portion thereof are mounted to be exposed to an outside of the tilting mounting space.

Moreover, the tilting unit may be formed in a hexahedral shape that is inserted into and disposed in the tilting mounting space, and tilting braking washer pads may be interposed between inner lateral surfaces of the arm unit by which the tilting mounting space is defined on left and right lateral surfaces of the tilting unit.

Moreover, at least one tilting guide may be formed at the front end portion of the arm unit, to which the tilting mounting space is provided, in a slot hole shape so as to guide a tilting motion of the tilting unit.

Moreover, the rotation unit may include: antenna coupling stages that are coupled with the antenna device; and a rotating mounting block in which a rotating shaft rod inserted into and placed in the rotating shaft hole of the tilting unit is formed.

Moreover, the rotation unit may further include an expansion connector that is expanded to connect the antenna coupling stages and the rotating mounting block in a left-right direction.

Advantageous Effects

In an embodiment of the clamping device for an antenna according to the present disclosure, tilting and rotating motions of the antenna device are facilitated through a tilting unit and a rotation unit, and thus workability and frequency yield performance of the antenna device can be improved.

In addition, in an embodiment of the clamping device for an antenna according to the present disclosure, convenience of installation and assembly the antenna device with respect to the tilting unit can be provided.

DESCRIPTION OF DRAWINGS

FIG. 13 is a side view of FIG. 9 which illustrates a tilting motion caused by the tilting unit.

DESCRIPTION OF REFERENCE NUMERALS

Figure 1:
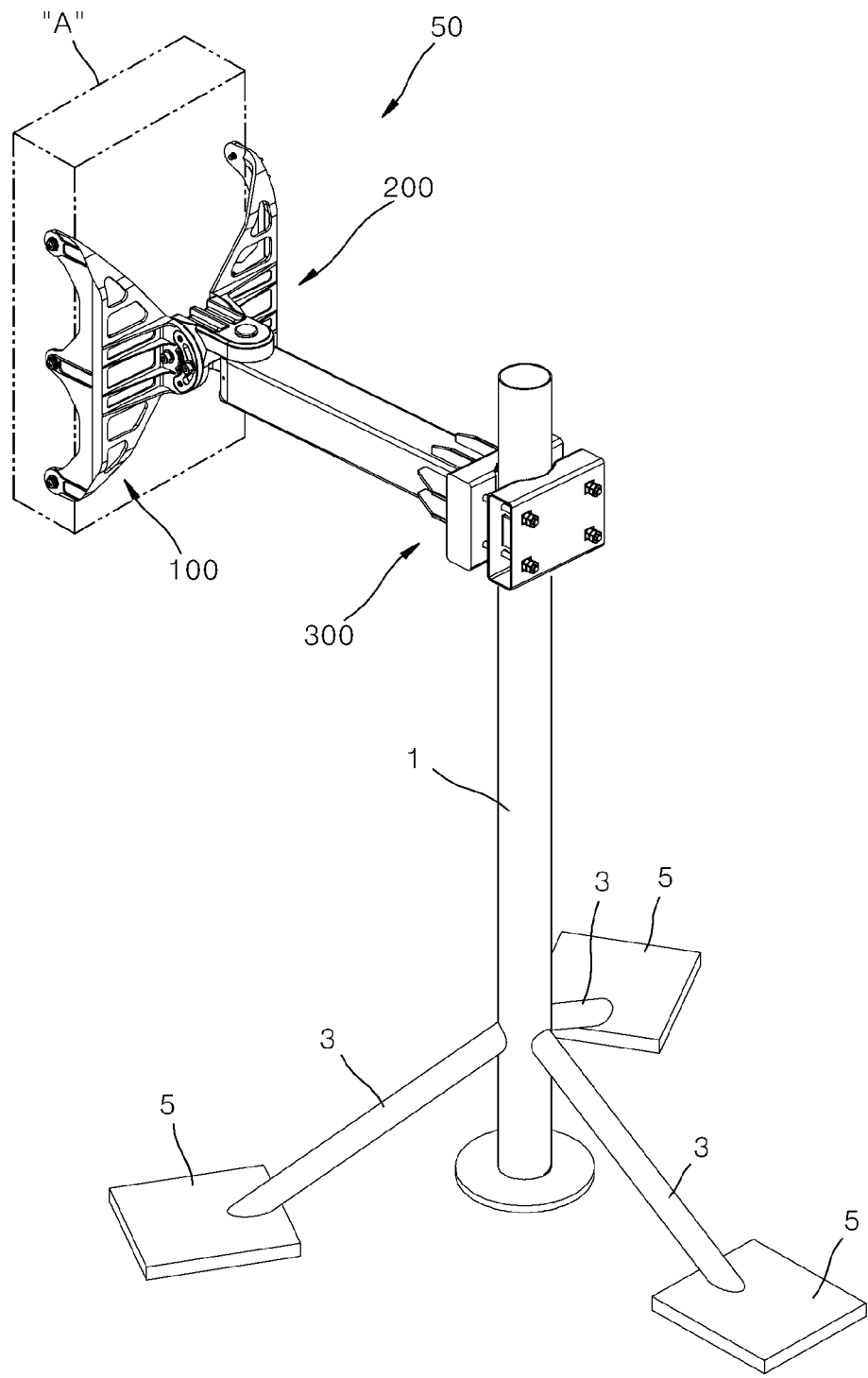
FIG. 1 is a perspective view illustrating an example of a state in which an antenna device is installed in an embodiment of a clamping device for an antenna according to the present disclosure.

1: support pole 3: multiple support rods
5: supporting panel 50: clamping device for antenna
100: tilting unit 101: antenna coupling stage
102: guide slot mounting recess 103: tilting plate
104: tilting braking washer pad mounting recess 107: reinforcement rib
108: fixing hole 109: tilting guide
110': fastening bolt 120: tilting braking washer pad
121: fastening hole 122: fastening screw
123: washer through-slot 125: braking protrusion
127: rotating pin through-hole 130: tilting guide plate
131: fastening hole 132: fastening screw
133: tilting guide slot 140: tilting pin
150: tilting angle label 200: rotation unit 210: tilting unit installing stage 300: arm unit
310: outer mounting block 311: outer bolt through-hole
320: inner mounting block 323: inner shape-fitting recess
325: fixing bolt 330: clamp arm
331: rotating shaft hole 343: outer shape-fitting recess
360: fastening nut

BEST MODE

Hereinafter, an embodiment of a clamping device for an antenna according to the present disclosure will be described in detail with reference to the accompanying drawings. In adding reference numerals to the elements of each drawing, it should be noted that the same elements have the same reference numerals as much as possible even if they are displayed in different drawings. Moreover, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 2:
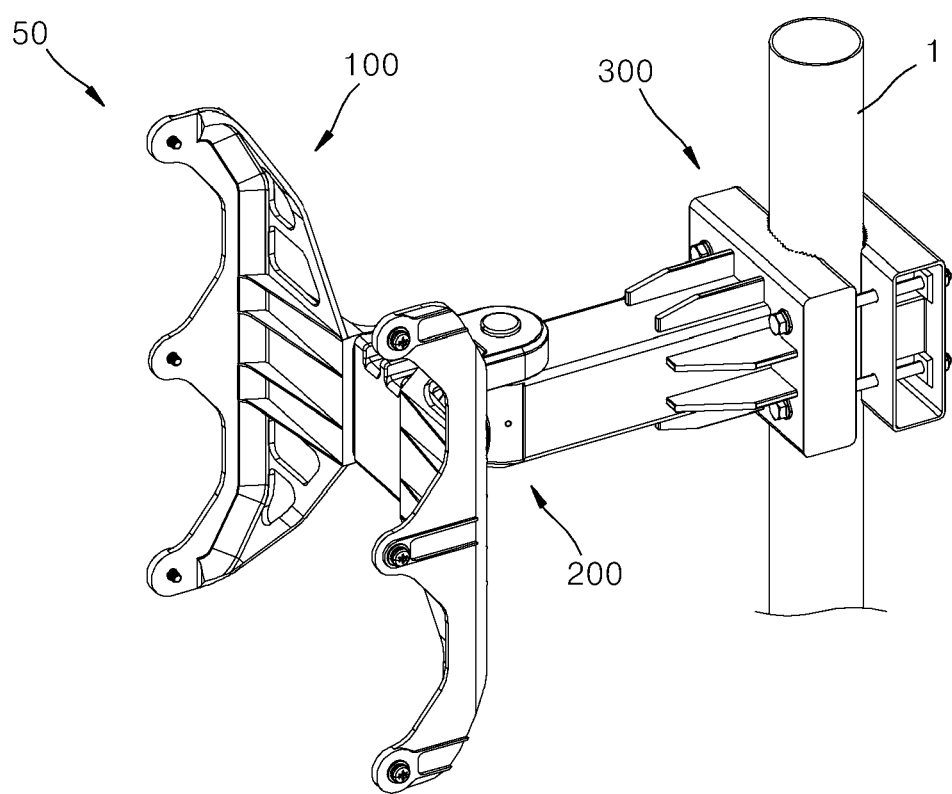
FIG. 2 is a perspective view illustrating an embodiment of a clamping device for an antenna according to the present disclosure.
Figure 3:
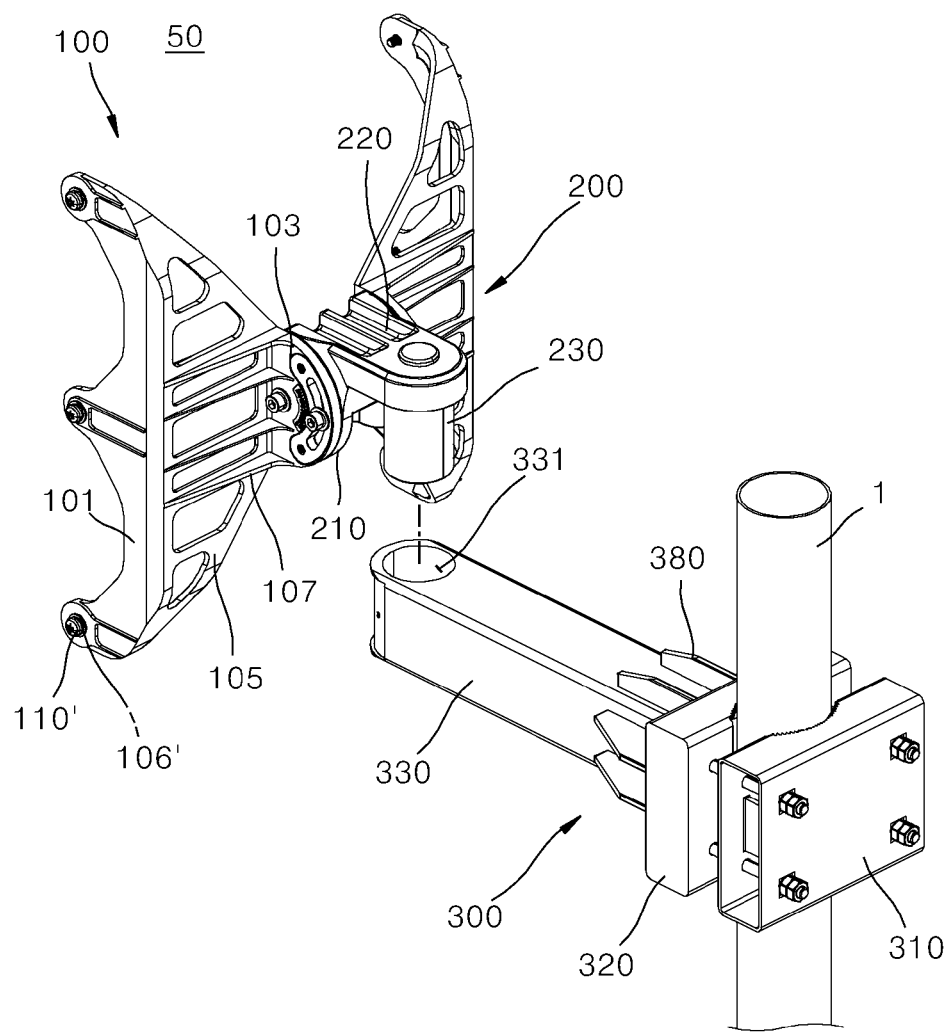
FIG. 3 is an exploded perspective view of the clamping device of FIG. 2.
Figure 4:
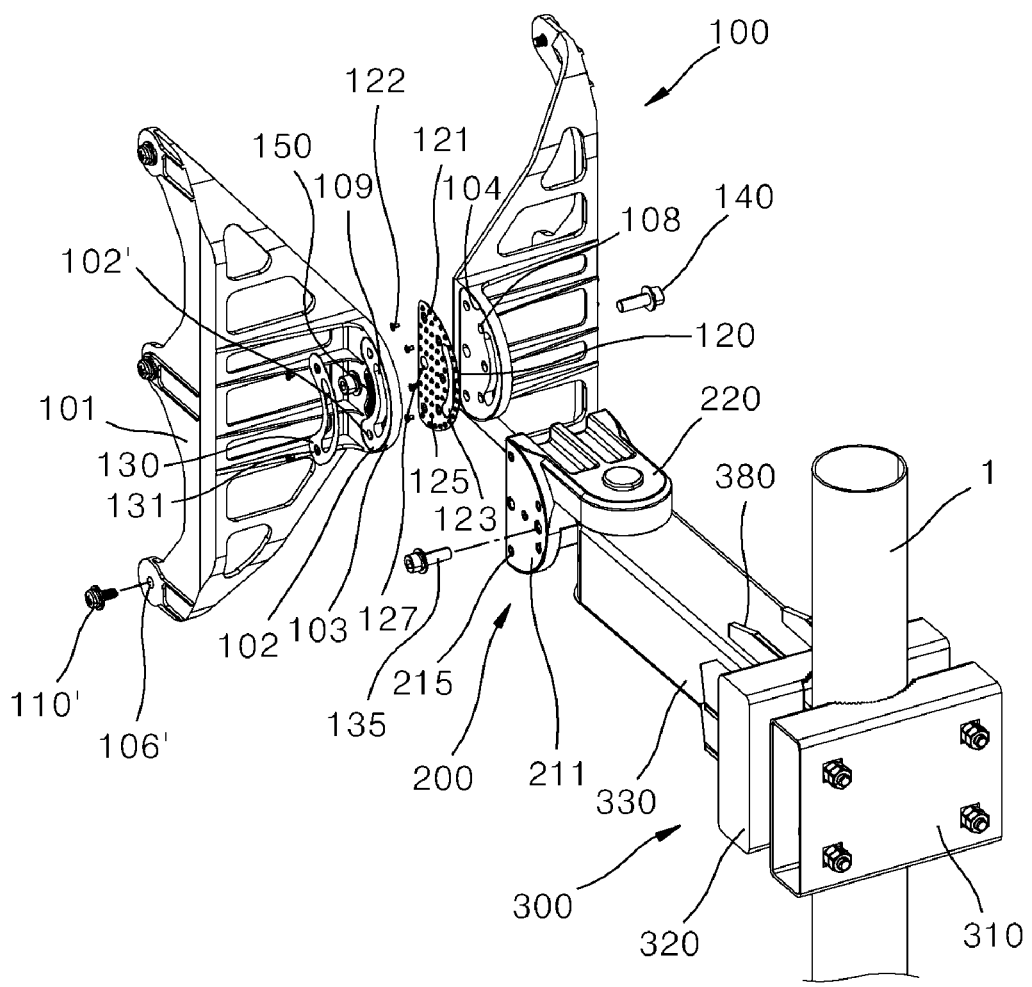
FIG. 4 is an exploded perspective view illustrating a tilting unit among the components of FIG. 2.
Figure 5:
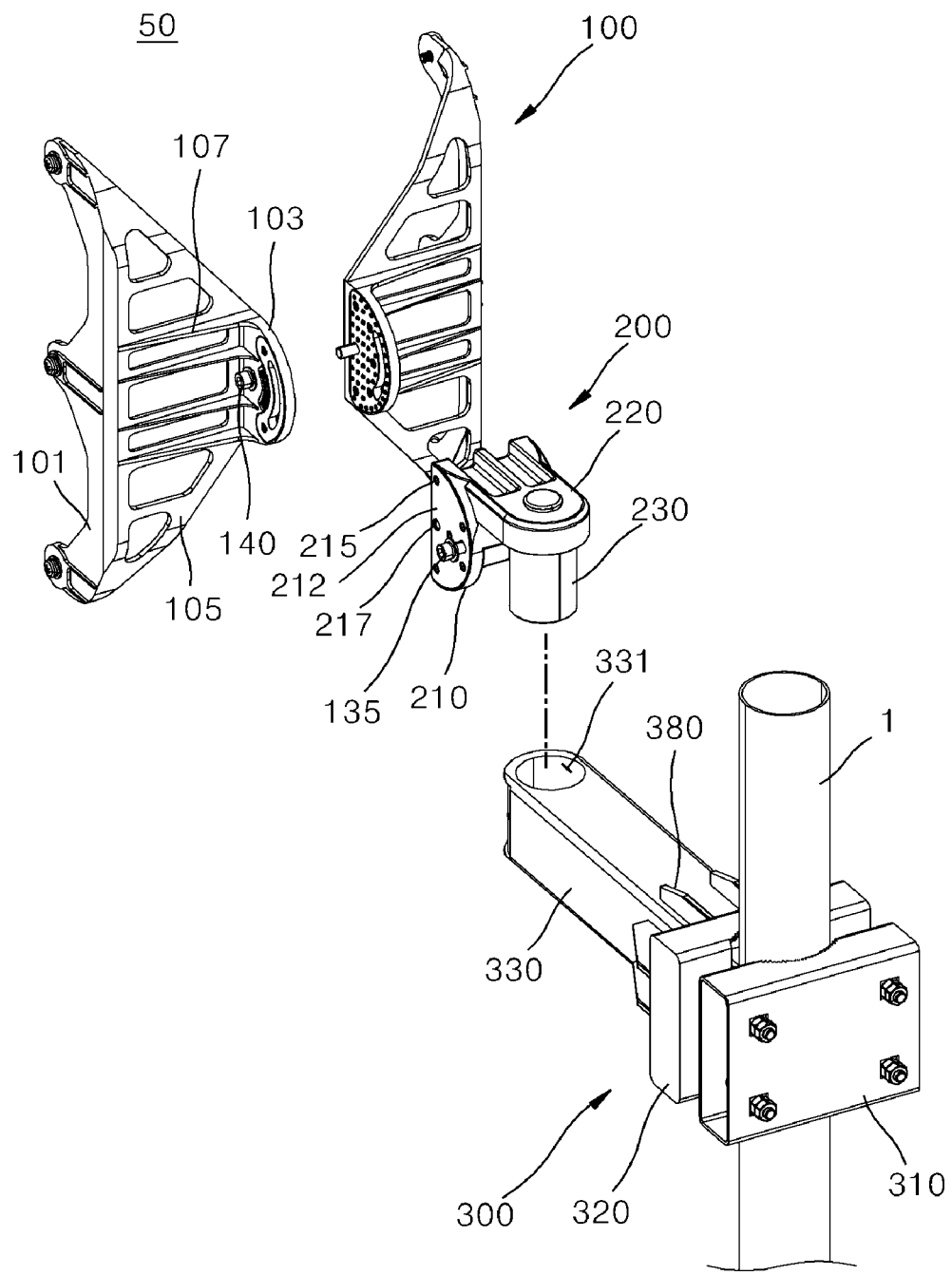
FIG. 5 is an exploded perspective view illustrating a rotation unit among the components of FIG. 2.
Figure 6:
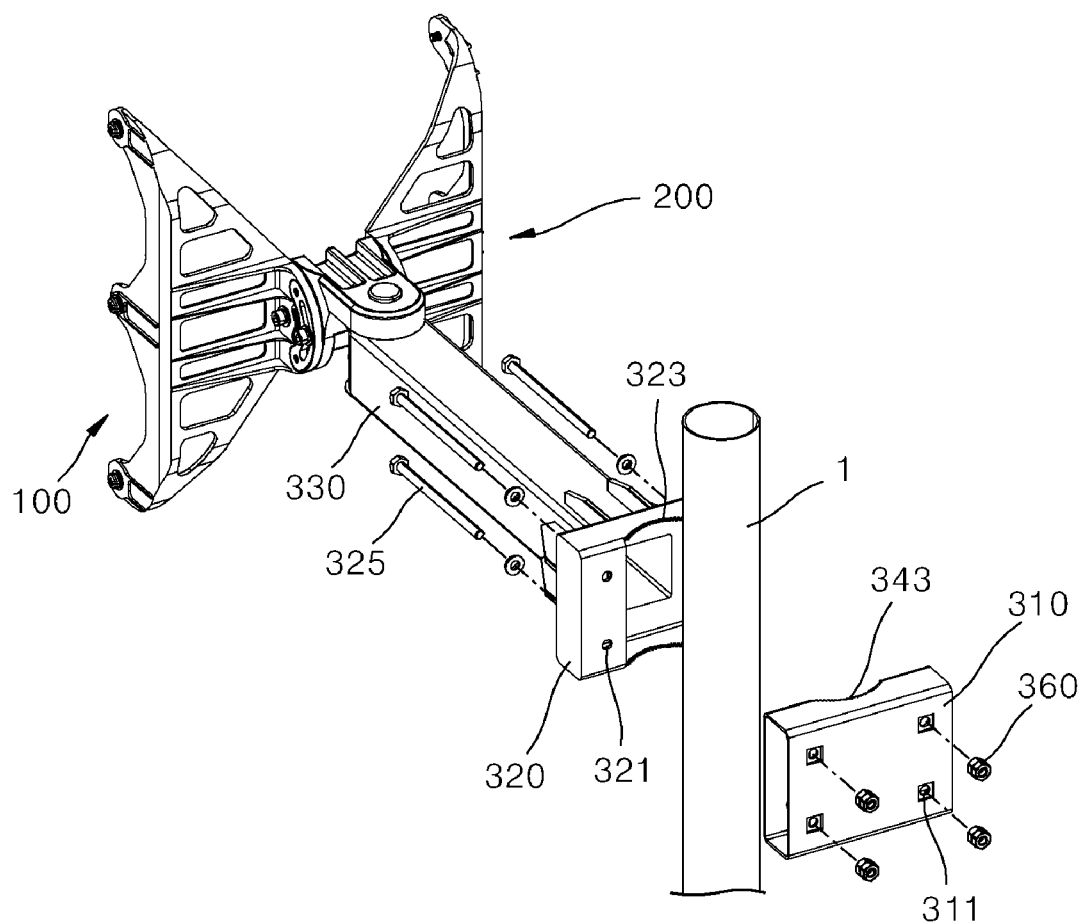
FIG. 6 is an exploded perspective view illustrating an arm unit among the components of FIG. 2.

FIG. 1 is a perspective view illustrating an example of a state in which an antenna device is installed in an embodiment of a clamping device for an antenna according to the present disclosure. FIG. 2 is a perspective view illustrating an embodiment of a clamping device for an antenna according to the present disclosure. FIG. 3 is an exploded perspective view illustrating the clamping device of FIG. 2. FIG. 4 is an exploded perspective view illustrating a tilting unit among the components of FIG. 2. FIG. 5 is an exploded perspective view illustrating a rotation unit among the components of FIG. 2. FIG. 6 is an exploded perspective view illustrating an arm unit among the components of FIG. 2.

Referring to FIGS. 1 to 6, an embodiment of a clamping device 50 for an antenna according to the present disclosure includes an arm unit 300 that is coupled to a support pole 1, a rotation unit 200 that is coupled with the arm unit 300 and is coupled to be rotatable about the arm unit 300 in a left-right direction, and a tilting unit 100 that is coupled to the rotation unit 200 and is coupled to be tiltable in an up-down direction while mediating coupling of an antenna device A.

Referring to FIG. 1, the support pole 1 in an embodiment of the present disclosure is implemented by being fixed to the ground via multiple support rods 3 and multiple supporting panels 5 in a vertical direction, and is implemented in such a manner that the arm unit 300 is horizontally coupled with the support pole so as to be perpendicular to the support pole.

However, the support pole 1 is not necessarily provided to the ground in a vertical direction, and may be naturally coupled to a vertical wall of a building via the multiple support rods 3 and the multiple supporting panels 5. In this case, the support pole 1 is provided horizontally, and the arm unit 300 is perpendicular to the support pole 1. However, various embodiments in which the arm unit 300 or the support pole 1 are actually provided horizontally or vertically can be expected.

Hereinafter, the description is made on the assumption that, referring to FIG. 1, to enable a direction and its relevant term to be identical to each other, the support pole 1 is fixed to the ground of a horizontal state via the multiple support rods 3 and the multiple supporting panels 5 in a vertical direction, and the description is made within the limits of the case in which the arm unit 300 extends in a horizontal direction orthogonal to the support pole 1. However, it is made clear in advance that an embodiment of the present disclosure does not necessarily limit these directions.

Referring to FIG. 1, the arm unit 300 serves to mediate coupling of the antenna device A to the support pole 1. It can be understood that, as another meaning, the arm unit 300 serves to mediate coupling of the antenna device A to the support pole 1 of the tilting unit 100 and the rotation unit 200.

The antenna device A coupled by the clamping device 50 for an antenna according to an embodiment of the present disclosure may be the antenna device A to which the Massive MIMO technology or the FD-MIMO technology in which the 3D-Beamforming is possible, which is introduced in the "Background Art" described previously, is applied.

This arm unit 300 may be formed in such a form that it is substantially coupled to one side and the other side of an outer circumferential surface of the support pole 1 by bolting and that it extends at a predetermined length in a direction perpendicular to a lengthwise direction of the support pole 1 and the antenna device A is installed spaced apart from the support pole 1 by a predetermined length.

Referring to FIG. 1, the support pole 1 may further include the multiple support rods 3 that slantly extend downward from the outer circumferential surface of the support pole 1 so as to be radially spaced apart from one another by a predetermined angle, and the multiple supporting panels 5 that are provided at tips of the multiple support rods 3 and are supported and coupled to a ground or a wall.

The multiple support rods 3 may be fixed to and formed integrally with the support pole 1 by welding, as well as be separately manufactured and coupled to the support pole 1 by various coupling methods such as bolting.

Moreover, the supporting panels 5 may be provided with bolt fastening holes (not illustrated) so as to be coupled to the ground or the wall using fastening members such as bolts.

Meanwhile, the rotation unit 200 may be coupled to a tip portion of the arm unit 300 so as to be rotatable in a left-right direction. The rotation unit 200 is rotated about the tip portion of the arm unit 300 in a left-right direction, thereby serving to substantially facilitate directivity design of the left-right direction of the antenna device A coupled to the tilting units 100.

Moreover, the tilting unit 100 is coupled to a tip portion of the rotation unit 200 so as to be tiltable in an up-down direction. The tilting unit 100 is tilted about the tip portion of the rotation unit 200 in an up-down direction, thereby serving to substantially facilitate directivity design of the up-down direction of the antenna device A coupled to the tilting unit 100.

In this way, an embodiment of the clamping device 50 for an antenna according to the present disclosure enables angle fixation with respect to a radiation direction of radio waves, which are radiated from a front surface of the antenna device A coupled to the support pole 1, by rotating the antenna device A in a left-right direction using the rotation unit 200, as well as by tilting the antenna device A in an up-down direction using the tilting unit 100. A state of the angle fixation caused by the rotation unit 200 and the tilting unit 100 will be described below in greater detail.

Hereinafter, for the convenience of understanding, the description will be made by defining a front direction of the antenna device A as "front", defining the opposite direction as "rear", defining a left side of the front as "leftward direction" and a right side of the front as "rightward direction", and defining an upper side of the antenna device A as "upward direction" and a lower side of the antenna device A as "downward direction".

Hereinafter, the description will be made in greater detail from an adjacent component centering on the antenna device A.

Referring to FIGS. 1 to 6, the antenna device A is coupled to a tip portion of the tilting unit 100. More specifically, in a state in which the antenna device A is coupled to the tip portion of the tilting unit 100, the tilting unit 100 is tiltably coupled to the tip portion of the rotation unit 200. In this state, referring to FIG. 3, a rotating shaft rod 230 of the rotation unit 200 is inserted into and placed in a rotating shaft hole 331 that is provided in the front end portion of the arm unit 300 fixed to the support pole 1, whereby, referring to FIG. 2, the installation of the antenna device A based on an embodiment of the clamping device 50 for an antenna according to the present disclosure can be completed.

Here, referring to FIG. 4, the tilting unit 100 may include antenna coupling stages 101 that are coupled with the antenna device A, and tilting plates 103, each of which extends in the rear where the rotation unit 200 is provided and is coupled to come into surface contact with one outer lateral surface or the other outer lateral surface of the rotation unit 200.

Moreover, referring to FIGS. 3 and 4, the tilting unit 100 may further include an expansion connector 105 that expands to be connected between each of the antenna coupling stages 101 and each of the tilting plates 103 in a left-right direction. The expansion connector 105 may be formed in an approximately triangular plate shape, and be formed to partly cover a rear surface of the antenna device A.

Each of the antenna coupling stages 101 is a part that comes into close contact with the rear surface or a lateral surface of the antenna device A and has bolt through-holes 106' formed to be able to be bolted by fastening bolts 110'. Referring to FIG. 4, the bolt through-holes 106' may be formed in three bolt fastening stages 106 that are formed spaced apart from one another up and down by a predetermined distance. In the clamping device 50 for an antenna according to an embodiment of the present disclosure, a structure in which each of the antenna coupling stages 101 comes into close contact with lateral surfaces of the antenna device A and the bolt through-holes 106' are formed to be crossed in a left-right direction is adopted, but the clamping device 50 is not necessarily limited thereto. A structure in which each of the antenna coupling stages 101 comes into close contact with the rear surface of the antenna device A and the bolt through-holes 106' are crossed in a front-rear direction may also be naturally adopted.

Referring to FIG. 4, each of the tilting plates 103 is a part that has a surface parallel to a coupling surface of each of the antenna coupling stages 101 and orthogonal to each of the expansion connectors 105, and is a part that is substantially coupled to a left or right lateral surface of the tip portion of the rotation unit 200.

Multiple reinforcement ribs 107 are provided between each of the tilting plates 103 and each of the antenna coupling stages 101, and can improve durability by reinforcing a mechanical fatigue caused by weight of the antenna device A or wind around the antenna device A.

Each of the tilting plates 103 may be configured such that a tilting guide 109 is provided to an outer lateral surface thereof opposite to an inner lateral surface thereof which comes into close contact with the left or right lateral surface of a front end portion of the rotation unit 200 so as to guide the tilting motion of the tilting unit 100. The tilting guide 109 may be formed in a slot hole shape on the same circumference thereof centering on a tilting pin 140. This tilting guide 109 may be formed to pass through each of the tilting plates 103 in a left-right direction.

In addition, each of the tilting plates 103 may be configured such that a tilting pin 140 is provided to the inner lateral surface thereof which comes into close contact with the left or right lateral surface of the front end portion of the rotation unit 200 so as to become the tilting center of the tilting unit 100.

Meanwhile, referring to FIG. 4, the clamping device 50 for an antenna according to an embodiment of the present disclosure may further include tilting guide plates 130 that are coupled to guide slot mounting recesses 102 formed in outer lateral surfaces of the tilting plates 103 at which the tilting guides 109 are formed. Each of the tilting guide plates 130 may be provided in a plate shape that is shape-fitted to each of the guide slot mounting recesses 102, and be provided with a slot hole having the same shape as each of the above-described tilting guide 109. A fixing hole 102' to which a fastening screw 132 provided in a flat head screw shape is fastened by passing through a fastening hole 131 formed in each of the tilting guide plates 130 may be formed in each of the guide slot mounting recesses 102.

A tilting guide bolt 135 that passes through slot holes (with no reference numeral) of the tilting guide 109 and the tilting guide plate 130 from the outside may be fixed to the rotation unit 200.

Here, the slot holes formed in the tilting guide 109 and the tilting guide plate 130 are formed in the same circumference having the same center as the tilting pin 140, and may be formed to have circumferential surfaces on which the tilting unit 100 is tiltable upward and downward at a maximum angle of 40 degrees.

Referring to FIG. 4, a tilting angle label 150, which indicates a position of the tilting guide bolt 135 moving in the slot holes from a reference point at an angle, may be attached to an outer lateral surface of the tilting plate 130 which corresponds to one side of the tilting guide 109. [95] Here, the reference point for the position of the tilting guide bolt 135 refers to a horizontal state in which no tilting motion of the tilting plate 130 is performed and is indicated by "0 degree", and the tilting angle may be indicated with respect to each of upward tilting and downward tilting at angular intervals of 5° or 10°. Therefore, an installation worker mounts the antenna device A on the tilting unit 100, and then fixes the tilting unit 100 by tilting the tilting unit 100 at an accurate position through the tilting angle label 150, whereby reliability of installation work of the antenna device A can be improved.

The tilting pin 140 is a kind of bolt that is installed to pass through the tilting plate 130 from an outside to an inside of the tilting plate 130, is fixed to the outer lateral surface of the rotation unit 200 like a hinge, and becomes a tilting center of the tilting unit 100.

Meanwhile, tilting braking washer pads 120 may be interposed between inner lateral surfaces of the tilting plates 103 and the outer lateral surfaces of the rotation unit 200. Each of the tilting braking washer pads 120 may be fastened to a tilting braking washer pad mounting recess 104 recessed in the inner lateral surface of the tilting plate 130 in a shape-fitted state into the tilting braking washer pad mounting recess 104 by a process of fastening screws 122 provided in the form of a flat head screw passing through and being fastened to fastening holes 121 formed across left and right and fixing holes 108 formed in the inner lateral surface of the tilting plate 130.

A plurality of braking protrusions 125 are formed on an inner lateral surface of each of the tilting braking washer pads 120 so as to protrude inward, thereby serving to prevent the antenna device A from being arbitrarily tilted by weight of the antenna device A and an external force such as a wind blowing around the antenna device A by forming a predetermined friction force against the outer lateral surface of the rotation unit 200 during the tilting motion of the tilting unit 100.

A washer through-slot 123, through which the tilting guide bolt 135 can pass and be fastened, may be formed in each of the tilting braking washer pads 120 in a shape corresponding to the slot holes of the tilting guide 109 and the tilting plate 130. The tilting guide bolt 135 is a bolt that is fastened and fixed to the left or right lateral surface of the tip portion of the rotation unit 200, may pass through the slot holes of the tilting guide 109 and the tilting plate 130 and the washer through-slot 123 of the tilting braking washer pad 120 in turn, and be fastened and fixed to the left or right lateral surface of the front end portion of the rotation unit 200.

If a predetermined tilting external force is provided to the tilting plates 103 having this configuration when upward/downward tilting of the antenna device A coupled to front end portions of the tilting plates 103 is required, after an upward or downward tilting motion is performed within a tilting angle range of the slot holes of the tilting guide 109 and the tilting plate 130 or the washer through-slot 123 of the tilting braking washer pad 120 when an external force exceeding a friction force between the tilting braking washer pads 120 and the tilting plates 103 is provided, the tilting plates 103 may be fixed.

Meanwhile, referring to FIG. 5, the rotation unit 200 may include tilting unit installing stages 210 to which the tilting unit 100 is tiltably coupled, a rotating shaft rod 230 that is inserted into the rotating shaft hole 331 of the arm unit 300, and a connecting block 220 that interconnects the tilting unit installing stages 210 and the rotating shaft rod 230.

Here, the tilting unit installing stages 210 are provided apart from each other in a pair so as to extend from left and right ends of the connecting block 220 toward the tilting unit 100. As described above, the tilting pins 140 acting as the tilting center of the tilting unit 100 may be provided on outer lateral surfaces of the tilting unit installing stages 210 so as to be connected with the tilting unit 100.

That is, the above-described tilting plates 103 of the tilting unit 100 are installed on the outer lateral surfaces of the tilting unit installing stages 210 of the rotation unit 200, and may be provided in a pair like the tilting unit installing stages 210.

As described above, the tilting guide bolts 135 are fixed to the outer lateral surfaces of the tilting unit installing stages 210 so as to pass through the slot holes of the tilting guides 109 and the tilting plates 130 which are formed in the tilting plates 103 of the tilting unit 100 and the washer through-slots 123 of the tilting braking washer pads 120, and tilting pin fastening holes 217 may be formed in the tilting unit installing stages 210 such that the tilting pins 140 pass through and are fastened to the tilting plates 103 of the tilting unit 100.

In addition, friction pads 212, which provide friction surfaces against which the braking protrusions 125 of the tilting braking washer pads 120 are rubbed, may be installed in pad installation recesses 211 of the outer lateral surfaces of the tilting unit installing stages 210 by flat head screws 215. Therefore, the friction pads 212 can be easily replaced when worn by a continuous tilting motion.

Meanwhile, in the clamping device 50 for an antenna according to an embodiment of the present disclosure, referring to FIG. 5, the rotation unit 200 may further include the rotating shaft rod 230 that is integrally or separately manufactured and coupled to a lower side of a rear end portion of the connecting block 220.

The rotating shaft rod 230 is a part which is inserted into and installed in the rotating shaft hole 331 provided in a front end portion of the clamp arm 330 (to be described below) of the arm unit 300 in a circular hollow form so as to open upward, and which enables the rotation unit 200 to be rotated about the rotating shaft hole 331 in a left-right direction.

Meanwhile, referring to FIG. 6, the arm unit 300 may include an outer mounting block 310 that is disposed to come into close contact with one side of the outer circumferential surface of the support pole 1, an inner mounting block 320 that is disposed to come into close contact with the other side of the outer circumferential surface of the support pole 1 and is fixed with the outer mounting block 310 by at least one or more fixing bolts 325, and a clamp arm 330 that extends from the inner mounting block 320 at a predetermined length in a direction orthogonal to the support pole 1 and constitutes a front end portion to which the rotating shaft hole 331 is provided.

The outer mounting block 310 may be formed of a steel material and may form a frame. An outer shape-fitting recess 343, which is a part that is substantially shape-fitted to the one side of the outer circumferential surface of the support pole 1, may be formed in the outer mounting block 310. Although not illustrated in the drawing, the outer shape-fitting recess 343 is provided in a support block (not illustrated) that is formed of an elastic material having a high friction force such that a slip is not generated between the support block and the support pole to come into close contact, and may be substantially coupled to be disposed between the support block and the support pole 1.

At least one or more outer bolt through-holes 311 through which fixing bolts 325 pass may be formed in left and right opposite ends of the outer mounting block 310 so as to be spaced up and down. Here, the outer mounting block 310 is formed of a metal material having a hexahedral shape that is empty therein, and the outer bolt through-holes 311 may be formed in front and rear end faces of the outer mounting block 310 at corresponding positions such that the fixing bolts 325 can completely pass through the outer mounting block 310 in a front-rear direction.

The outer mounting block 310, the support block 340, and the inner mounting block 320 are fastened such that the fixing bolts 325 pass through the inner bolt through-holes 321 and bolt through-holes 311 from the side of the inner mounting block 320 in turn, and then are firmly fastened using fastening nuts 360, whereby the antenna device A can be stably supported.

Here, referring to FIG. 6, the fastening nuts 360 are fastened to end portions of the fixing bolts 325 exposed to a rear surface of the outer mounting block 310 and, although not illustrated in the drawing, are fastened to an empty space between front and rear surfaces of the outer mounting block 310 in a hidden state. Thereby, the fastening nuts 360 can be provided such that arbitrary disassembly is made difficult by a third person.

Among the components of the outer mounting block 310, the outer shape-fitting recess 343, which is a part that substantially comes into close contact with the one side of the outer circumferential surface of the support pole 1, may be formed to be recessed in a shape corresponding to the outer circumferential surface of the support pole 1 in order to improve a close contact area with respect to the support pole 1 having a circular horizontal cross section. In addition, the outer shape-fitting recess 343 may be subjected to serration machining such that multiple serration ribs are formed for a stronger friction force while being compressed on the outer circumferential surface of the support pole 1 by a fastening force from the fixing bolts 325 and the fastening nuts 360.

In addition, an inner shape-fitting recess 323 corresponding to the outer shape-fitting recess 343 of the outer mounting block 310 may be formed in an outer surface of the inner mounting block 320, i.e. a surface that substantially comes into close contact with the support pole 1. The inner mounting block 320 is formed of a steel material for support rigidity. However, regardless of this, the inner shape-fitting recess 323 may also be subjected to serration machining such that multiple serration ribs are formed to prevent a slip from being generated between the inner mounting block 320 and the support pole 1.

The inner mounting block 320 and the clamp arm 330 may be integrally molded. Here, the inner mounting block 320 may be formed such that an up-down-left-right area (i.e., a front area) thereof is relatively larger than that occupied by the clamp arm 330. In contrast, depending on an embodiment, a tip portion of the clamp arm 330 may be formed to have various distances spaced apart from the support pole 1.

When a length of the clamp arm 330 is relatively short, weight of the antenna device A can be sufficiently supported by an integral molding method of a connecting part between the inner mounting block 320 and the clamp arm 330. However, referring to FIG. 5, when the length of the clamp arm 330 is relatively long, at least one or more reinforcement ribs 380 may be formed at the connecting part between the inner mounting block 320 and the clamp arm 330.

Meanwhile, referring to FIG. 5, the rotating shaft hole 331 in which the rotating shaft rod 230 of the rotation unit 200 is rotatably inserted and installed is provided in a front end portion of the clamp arm 330. Although not illustrated in the drawing, a coupling means (not illustrated) for coupling with the rotating shaft rod 230 of the rotation unit 200 which is inserted into and placed in the rotating shaft hole 331 may be further provided in the rotating shaft hole 331.

The coupling means maintains coupling with the rotating shaft rod 230 which is inserted into and placed in the rotating shaft hole 331, and a haptic stopping structure (not illustrated) that makes it possible for the rotation unit 200 to be rotated to any one of leftward and rightward directions and can be stopped unless a fixed external force is provided at each predetermined angle may be applied to the coupling means.

Here, the haptic stopping structure refers to a structure that can maintain a stop state in which the rotation unit 200 is not rotated unless a predetermined external force or more is provided to the rotation unit 200 and can maintain a rotatable state reversely if the predetermined external force or more is provided.

Figure 7:
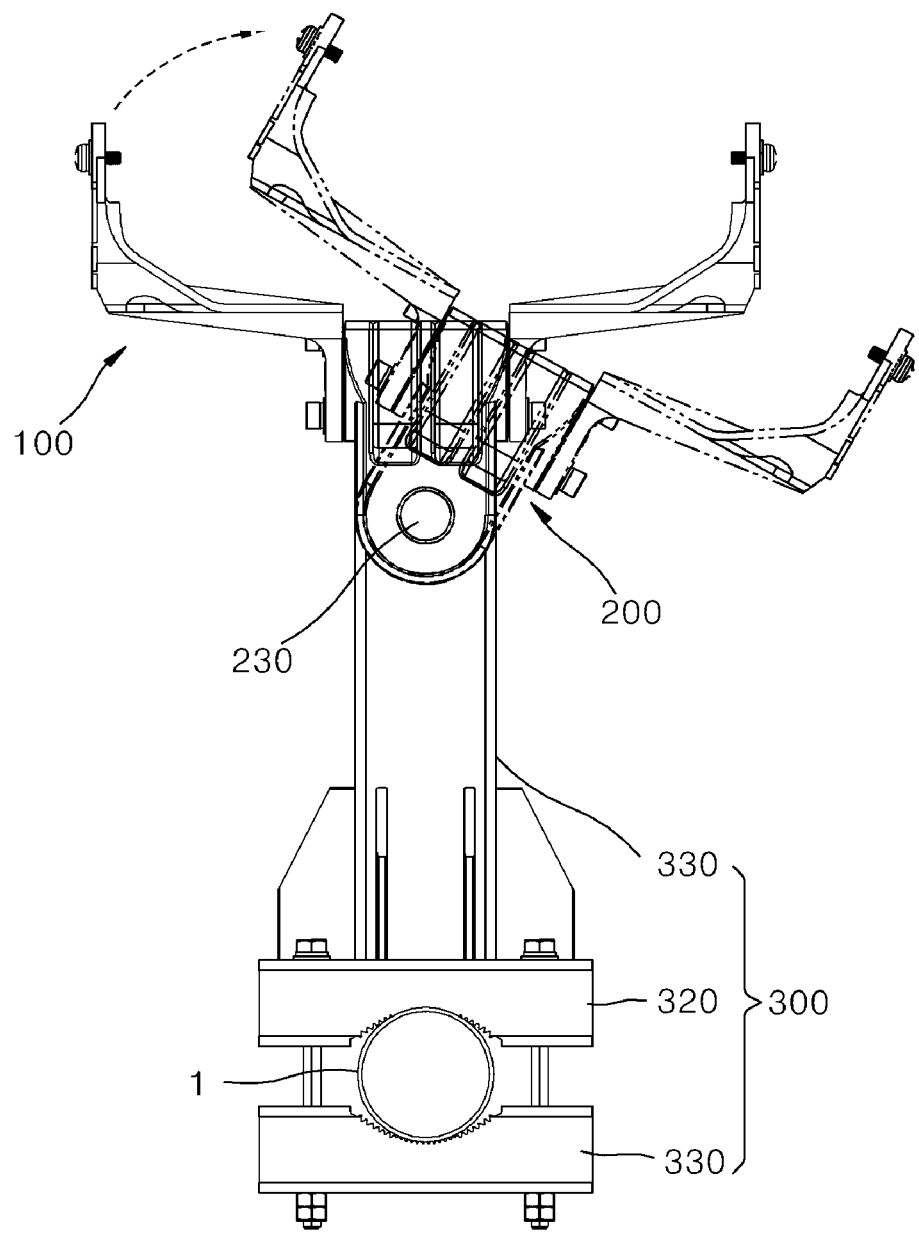
FIG. 7 is a top view of FIG. 2 which illustrates a rotating motion caused by the rotation unit.
Figure 8:
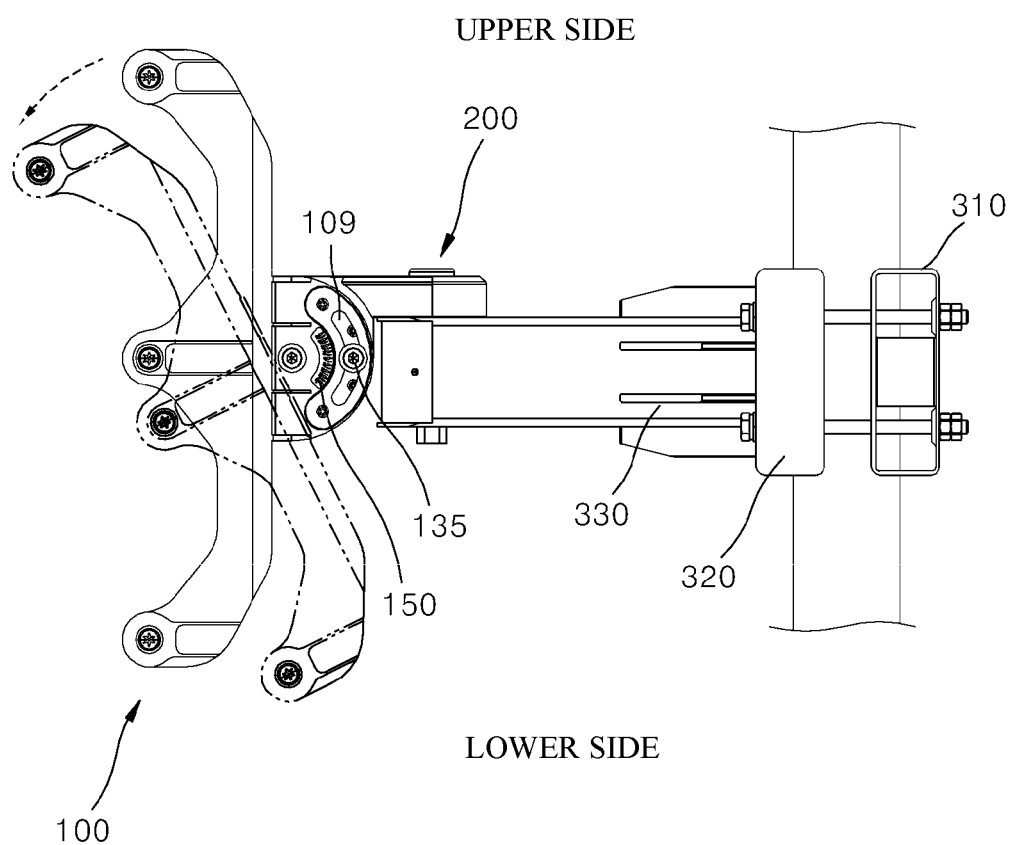
FIG. 8 is a side view of FIG. 2 which illustrates a tilting motion caused by the tilting unit.

FIG. 7 is a top view of FIG. 2 which illustrates a rotating motion caused by the rotation unit. FIG. 8 is a side view of FIG. 2 which illustrates a tilting motion caused by the tilting unit.

Referring to FIGS. 7 and 8, the rotating and tilting motions of the clamping device 50 for an antenna according to an embodiment of the present disclosure will be described below in greater detail.

First, looking at the rotating motion, in a state in which the antenna device A is coupled to the tip portion of the tilting unit 100, when a predetermined external force is applied to the antenna device A or the rotation unit 200 as illustrated in FIG. 7, the antenna device A or the rotation unit 200 can be rotated in a left-right direction and be stopped and fixed at a preset position by the coupling means having the haptic stopping structure.

In this case, predetermined moment based on the support pole 1 is applied to the rotation unit 200 including the antenna device A, but the outer shape-fitting recess 343 and the inner shape-fitting recess 323 formed in the arm unit 300 are formed by serration machining and are firmly coupled to the support pole 1 in close contact with the support pole 1, whereby movement during the rotating motion can be prevented.

Next, looking at the tilting motion, in a state in which the antenna device A is coupled to the tip portion of the tilting unit 100, when a predetermined external force is applied to the antenna device A or the tilting unit 100 as illustrated in FIG. 8, the tilting unit 100 is configured in such a way that the tilting guide bolts 135 are tilted within ranges of the slot holes of the tilting guides 109 and the tilting plates 130 on the basis of the tilting pins 140.

After a tilting angle for the antenna device A is adjusted, an arbitrary tilting motion is prevented by the tilting braking washer pads 120 provided between the rotation unit 200 and the tilting unit 100, whereby reliability of work is increased.

Figure 9:
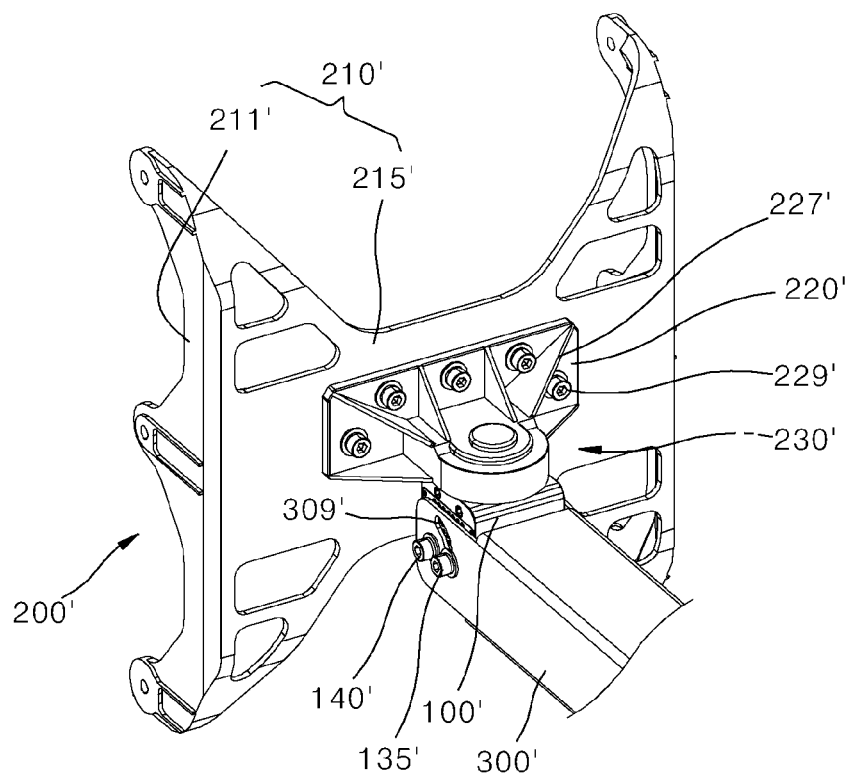
FIG. 9 is a perspective view illustrating another embodiment of the clamping device for an antenna according to the present disclosure.
Figure 10:
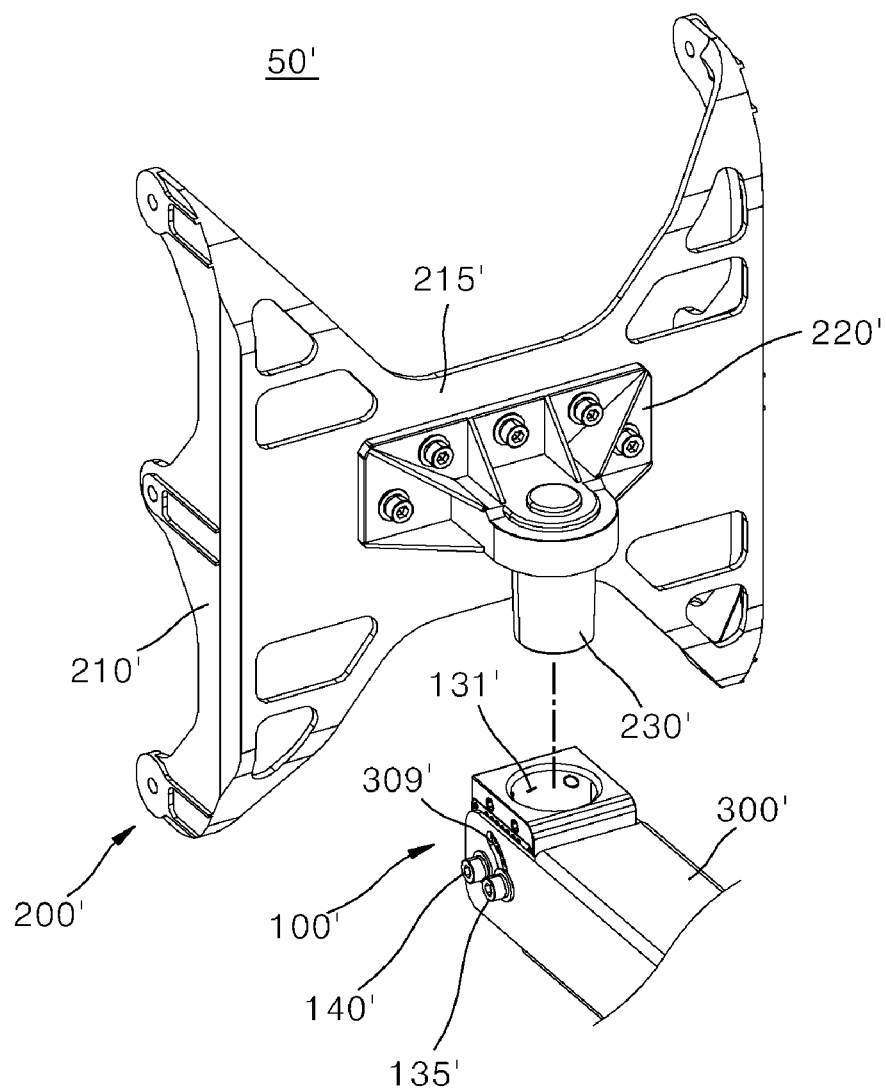
FIG. 10 is an installation exploded perspective view of FIG. 9.
Figure 11:
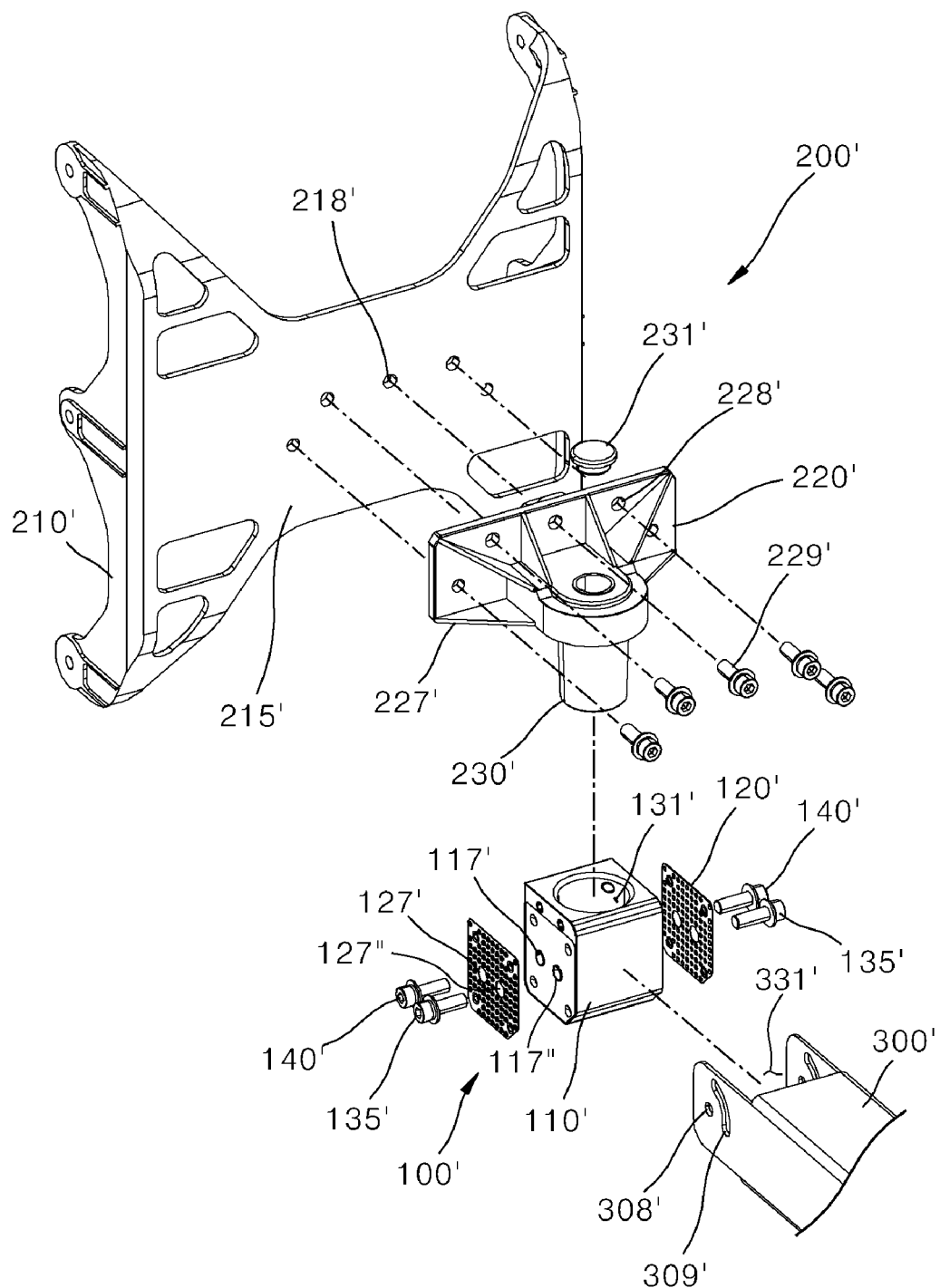
FIG. 11 is an exploded perspective view illustrating a rotation unit and a tilting unit among the components of FIG. 9.
Figure 12:
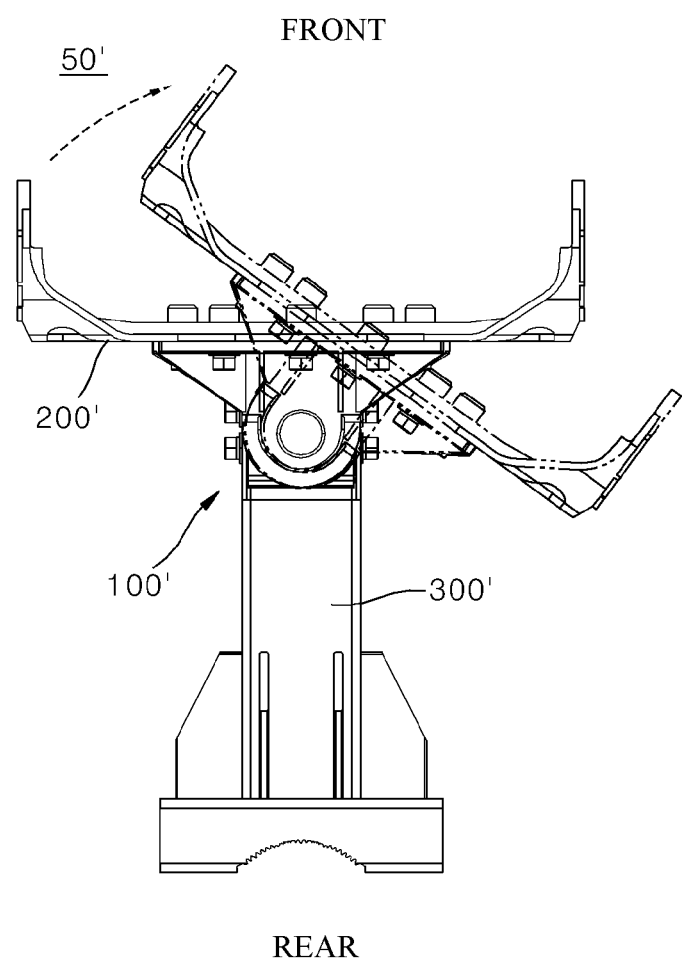
FIG. 12 is a top view of FIG. 9 which illustrates a rotating motion caused by the rotation unit.

FIG. 9 is a perspective view illustrating another embodiment of the clamping device for an antenna according to the present disclosure. FIG. 10 is an installation exploded perspective view of FIG. 9. FIG. 11 is an exploded perspective view illustrating a rotation unit and a tilting unit among the components of FIG. 9. FIG. 12 is a top view of FIG. 9 which illustrates a rotating motion caused by the rotation unit. FIG. 13 is a side view of FIG. 9 which illustrates a tilting motion caused by the tilting unit.

Referring to FIGS. 9 to 13, a clamping device 50' for an antenna according to another embodiment of the present disclosure may include an arm unit 300' which is coupled to a support pole 1 and in a front end portion of which a tilting mounting space 331' that opens front and rear and up and down except left and right sides is formed, a tilting unit 100' that is coupled to the tilting mounting space 331' of the arm unit 300' so as to be tiltable in an up-down direction and in which a rotating shaft hole 131' opening upward is formed, and a rotation unit 200' that is detachably mounted in the rotating shaft hole 131' of the tilting unit 100', is coupled to be rotatable about the rotating shaft hole 131' at a predetermined angle in a left-right direction, and mediates coupling of an antenna device A.

Unlike the above-described clamping device 50' for an antenna according to an embodiment of the present disclosure, the clamping device 50' for an antenna according to another embodiment of the present disclosure adopts a structure in which the component to which the antenna device A is substantially coupled is changed into the rotation unit 200', and is coupled to the arm unit 300' via the tilting unit 100'.

Therefore, the antenna coupling stages 101 provided at the front end portion of the existing tilting unit 100 may be provided as antenna coupling stages 210' at a front end of the rotation unit 200', the expansion connectors 105 of the existing tilting unit 100 may be provided as an expansion connector 215' of the rotation unit 200' with no change, and the tilting plates 103 of the existing tilting unit 100 may be replaced with a rotating mounting block 220' of the rotation unit 200'. This will be described below in greater detail.

Referring to FIG. 11, the tilting unit 100' may be formed in a hexahedral shape that is inserted into and disposed in the tilting mounting space 331', and tilting braking washer pads 120' may be interposed between inner lateral surfaces of the arm unit 300' which correspond to the tilting mounting space 331' on left and right lateral surfaces of the tilting unit 100'.

More specifically, the tilting unit 100' may be mounted in the tilting mounting space 331' provided in a tip portion of the arm unit 300', and be provided in a shape in which only an upper end portion thereof to which the rotation unit 200' is coupled and a lower end portion thereof opposite to the upper end portion thereof are mounted to be exposed to the outside of the tilting mounting space 331'.

Tilting pin holes 117' and tilting guide bolt fixing holes 117" into which tilting pins 140' and tilting guide bolts 135' are fixedly inserted may be formed in left and right lateral surfaces of the tilting unit 100', and tilting pin through-holes 127' and tilting guide bolt through-holes 127" through which the tilting pins 140' and the tilting guide bolts 135' pass may be formed in the tilting braking washer pads 120'.

Meanwhile, at least one tilting guide 309' may be formed at a front end portion of a clamp arm 330' of the arm unit 300' in a slot hole shape so as to guide a tilting motion of the tilting unit 100'. Here, the tilting guides 309' correspond to the tilting guides 109 formed at the tilting plates 103 in an embodiment of the present disclosure described above, but are provided in the arm unit 300' other than the tilting unit 100' in the clamping device 50' for an antenna according to another embodiment of the present disclosure, which is changed in structure. The tilting guide bolts 135' of the tilting unit 100' pass through the tilting guides 309', are fixed to the tilting unit 100' as described above, and are rotated by a tilting angle when the tilting unit 100' is interlocked and rotated about the tilting pins 140'.

Tilting holes 308' for fixing the tilting pins 140' may be formed in the front end portion of the clamp arm 330' which corresponds to one sides of the tilting guides 309'.

Meanwhile, referring to FIG. 11, the rotation unit 200' may include antenna coupling stages 210' that are coupled to the antenna device A, a rotating mounting block 220' which is located in the rears of the antenna coupling stages and in which the rotating shaft rod 230' inserted into and placed in the rotating shaft hole 131' of the tilting unit 100' is formed, and an expansion connector 215' that connects the antenna coupling stages 210' and the rotating mounting block 220'.

The antenna coupling stages 210' of the rotation unit 200' are components corresponding to the antenna coupling stages 101 of the tilting unit 100 described in an embodiment of the present disclosure, whose reference numerals are merely different.

However, the rotating mounting block 220' of the rotation unit 200' may be formed in a bracket shape, and be fixed to block fixing holes 218' formed in a rear surface of the expansion connector 215' by a process of passing through block through-holes 228' using multiple fastening members 229'. Here, the rotating mounting block 220' and the expansion connector 215' are not necessarily provided to be fixed using the fastening members 229', and it is natural that they may be integrally manufactured using a metal mold.

Meanwhile, the rotating shaft rod 230' may be provided on a lower side of a rear end portion of the rotating mounting block 220' so as to extend downward. A diameter of the rotating shaft rod 230' preferably has an approximate size in which the rotating shaft rod 230' is inserted into the rotating shaft hole 131' formed in the tilting unit 100'. The rotating shaft rod 230' may be formed in a hollow tube that is empty therein, and may communicate with an upper side of the rear end portion of the rotating mounting block 220'. In this way, an opening/closing cap 231' may be coupled to the upper side of the communicated rotating mounting block 220'.

When an upper end portion of the rotating shaft rod 230' is opened by the opening/closing cap 231', coupling work may be performed to be able to be coupled with a coupling means (not illustrated) using a separate tool. After the coupling of the coupling means is completed, the opening/closing cap 231' is coupled, and thus foreign materials can be prevented from being introduced from the outside.

Tilting and rotating motions of the clamping device 50' for an antenna according to another embodiment of the present disclosure configured as described above will be simply described below.

First, referring to FIG. 12, when a worker provides a predetermined external force or more to the rotation unit 200', the rotation unit 200' is rotated in a left-right direction by the coupling means (not illustrated) adopted as the haptic stopping structure using the rotating shaft rod 230' as a rotating center, and then stopped and fixed.

Referring to FIG. 13, when a worker provides an external force, which is equal to or higher than a predetermined friction force formed between the tilting braking washer pads 120' and the inner lateral surfaces of the clamp arm 330' of the arm unit 300', to the tilting unit 100', the tilting unit 100' is tilted in an up-down direction using the tilting pins 140' as tilting centers, and then the tilting unit 100' can be stopped and fixed at a fixed angle while the external force is removed.

An embodiment of the clamping device for an antenna according to the present disclosure has been described in detail with reference to the accompanying drawings. However, it goes without saying that embodiments of the present disclosure are not necessarily restricted by the embodiment described above and can be modified and carried out in an equivalent range by those skilled in the art to which the present disclosure pertains. Therefore, the scope of rights of the present disclosure will be defined by the following claims.

INDUSTRIAL APPLICABILITY

The present disclosure provides the clamping device for an antenna which can increase a degree of freedom of installation with respect to a support pole having many spatial limitations and improve workability.

The invention claimed is:

1. A clamping device for an antenna comprising:
an arm unit coupled to a support pole and having a rotating shaft hole that is formed in a front end portion thereof and opens upward;
a rotation unit detachably mounted in the rotating shaft hole of the arm unit and coupled to be rotatable about the rotating shaft hole at a predetermined angle in a left-right direction; and
a tilting unit coupled to a front end portion of the rotation unit so as to be tiltable in an up-down direction and configured to mediate coupling of an antenna device,
wherein the rotation unit comprises a body and a rotating shaft rod which is fixed to the body of the rotation unit, and the rotating shaft rod is configured to be inserted downwardly into and placed in the rotating shaft hole of the arm unit.

2. The clamping device for an antenna according to claim 1, wherein the arm unit comprises:
an outer mounting block disposed to come into close contact with one side of an outer circumferential surface of the support pole;
an inner mounting block disposed to come into close contact with the other side of the outer circumferential surface of the support pole and fixed with the outer mounting block by at least one or more fixing bolts; and
a clamp arm configured to extend from the inner mounting block at a predetermined length in a direction orthogonal to the support pole and to constitute a front end portion in which the rotating shaft hole is provided.

3. The clamping device for an antenna according to claim 2, wherein at least one or more reinforcement ribs are formed at a connecting part between the inner mounting block and the clamp arm of the arm unit.

4. The clamping device for an antenna according to claim 1, wherein the rotation unit comprises:
tilting unit installing stages to which the tilting unit is tiltably coupled; and
a connecting block that interconnects the tilting unit installing stages and the rotating shaft rod.

5. The clamping device for an antenna according to claim 4, wherein tilting braking washer pads are interposed between the tilting unit installing stages and the tilting unit.

6. The clamping device for an antenna according to claim 5, wherein tilting braking washer pad mounting recesses to which the tilting braking washer pads are coupled in a shape-fitted state are formed in inner lateral surfaces of the tilting unit installing stages.

7. The clamping device for an antenna according to claim 5, wherein a plurality of braking protrusions are formed on inner lateral surfaces of the tilting braking washer pads so as to protrude.

8. The clamping device for an antenna according to claim 5, wherein:
the tilting unit installing stages are provided in a pair so as to be spaced apart from each other and to extend from left and right end portions of the connecting block toward the tilting unit; and
tilting pins becoming a tilting center of the tilting unit are provided on outer lateral surfaces of the tilting unit installing stages so as to be connected to the tilting unit.

9. The clamping device for an antenna according to claim 1, wherein:
the tilting unit comprises:
antenna coupling stages that are coupled with the antenna device; and
tilting plates that are coupled to come into surface contact with one outer lateral surface or the other outer lateral surface of the rotation unit; and
tilting guides are formed in a slot hole shape and are attached to the tilting plates so as to guide a tilting motion of the tilting unit.

10. The clamping device for an antenna according to claim 9, wherein:
the tilting plates are tilted about tilting pins provided on outer lateral surfaces of the tilting unit installing stages of the rotation unit so as to become a tilting center of the tilting unit; and
the tilting guides comprise:
tilting guide slots that are formed on circumferences having common centers with the tilting pins; and
tilting guide bolts that pass through the tilting guide slots from an outside and are fixed to the rotation unit.

11. The clamping device for an antenna according to claim 9, wherein a tilting angle label, which indicates a position of the tilting guide bolt moving in the tilting guide slot from a reference point at an angle, is attached to an outer lateral surface of the tilting plate.

12. The clamping device for an antenna according to claim 9, wherein the tilting unit further comprises expansion connectors that are expanded to connect the antenna coupling stages and the tilting plates in a left-right direction.

13. The clamping device for an antenna according to claim 9, wherein each of the antenna coupling stages comes into surface contact with a plurality of places of any one of a rear surface and a lateral surface of the antenna device, and is fastened and fixed to fastening holes formed in the plurality of places of any one of the rear surface and the lateral surface of the antenna device via fastening means.

14. The clamping device for an antenna according to claim 1, wherein the support pole comprises:
multiple support rods that slantly extend downward from an outer circumferential surface of the support pole and are radially spaced apart from one another at a predetermined angle; and
supporting panels that are provided at tips of the multiple support rods and are supported and coupled to a ground or a wall.

15. A clamping device for an antenna comprising:
an arm unit which is coupled to a support pole and in a front end portion of which a tilting mounting space that opens front and rear and up and down except left and right sides is formed;
a tilting unit that is coupled to the tilting mounting space of the arm unit so as to be tiltable in an up-down direction and has a rotating shaft hole that opens upward; and
a rotation unit that is detachably mounted in the rotating shaft hole of the tilting unit, is coupled to be rotatable about the rotating shaft hole at a predetermined angle in a left-right direction, and mediates coupling of an antenna device,
wherein the rotation unit comprises a body and a rotating shaft rod which is fixed to the body of the rotation unit, and the rotating shaft rod is configured to be inserted downwardly into and placed in the rotating shaft hole of the arm unit.

16. The clamping device for an antenna according to claim 15, wherein the tilting unit is mounted in the tilting mounting space, and is provided in a shape in which only an upper end portion thereof to which the rotation unit is coupled and a lower end portion thereof opposite to the upper end portion thereof are mounted to be exposed to an outside of the tilting mounting space.

17. The clamping device for an antenna according to claim 15, wherein:
   the tilting unit is formed in a hexahedral shape that is inserted into and disposed in the tilting mounting space; and
   tilting braking washer pads are interposed between inner lateral surfacescuface& of the arm unit which correspond to the tilting mounting space on left and right lateral surfaces of the tilting unit.

18. The clamping device for an antenna according to claim 15, wherein at least one tilting guide is formed at the front end portion of the arm unit, to which the tilting mounting space is provided, in a slot hole shape so as to guide a tilting motion of the tilting unit.

19. The clamping device for an antenna according to claim 15, wherein the rotation unit comprises:
   antenna coupling stages that are coupled with the antenna device; and
   a rotating mounting block in which the rotating shaft rod inserted into and placed in the rotating shaft hole of the tilting unit is formed.

20. The clamping device for an antenna according to claim 15, wherein the rotation unit further comprises an expansion connector that is expanded to connect the antenna coupling stages and the rotating mounting block in a left-right direction.

* * * * *